United States Patent [19]

Kikuchi

[11] 4,427,987
[45] Jan. 24, 1984

[54] MAGNETIC LATENT IMAGE FORMING APPARATUS

[75] Inventor: Yoshiki Kikuchi, Kanagawa, Japan
[73] Assignee: Fuji Xerox Co., Ltd., Kanagawa, Japan
[21] Appl. No.: 309,135
[22] Filed: Oct. 6, 1981

[30] Foreign Application Priority Data

Oct. 7, 1980 [JP] Japan .................. 55-139411

[51] Int. Cl.$^3$ ............................ G01D 15/12
[52] U.S. Cl. ................................ 346/74.4
[58] Field of Search .............. 346/74.2, 74.4, 76 R, 346/76 L; 101/DIG. 5; 219/216; 360/59; 358/298, 299, 301; 430/39

[56] References Cited

U.S. PATENT DOCUMENTS 2,915,594 12/1959 Borns, Jr. et al. .............. 360/59
3,582,570 6/1971 Cushner et al. ................ 360/59
4,314,257 2/1982 Tokunaga et al. ............. 358/301

OTHER PUBLICATIONS

Kurtzig et al., Reorientation and Curie Point Writing in Orthoferrites, *J. of Applied Physics*, Mar. 15, 1971, pp. 1804-1805.
Huth, Calculations of Stable Domain Radii Produced by Thermomagnetic Writing, *IBM J. Res. Develop.*, Aug. 8, 1973, pp. 100-109.

*Primary Examiner*—Thomas H. Tarcza
*Attorney, Agent, or Firm*—Sughrue, Mion, Zinn, Macpeak and Seas

[57] ABSTRACT

In a magnetic latent image forming apparatus the magnetization of the medium is initially set and portions of the medium, selected in accordance with image data, are then heated to temperatures below the Curie temperature of the medium. Before the medium cools, a bias magnetic field is applied to magnetize the heated portions.

2 Claims, 2 Drawing Figures

MAGNETIC LATENT IMAGE FORMING APPARATUS

BACKGROUND OF THE INVENTION

This invention relates to magnetic latent image forming apparatus in which a magnetic medium is selectively heated so that the intensity of magnetization of selected portions thereof can be varied to thereby form a magnetic latent image. More particularly, the invention is related to a magnetic latent image forming apparatus in which a magnetic medium, after being heated, is subjected to a bias magnetic field, so that a magnetic latent image is formed. Such a single-tone apparatus is disclosed in related copending application Ser. No. 235,366 filed Feb. 19, 1981, the disclosure of which is incorporated herein by reference.

In order to form an image with such a conventional magnetic latent image forming apparatus, the magnetic medium is heated to the Curie temperature or higher. Therefore, such conventional apparatus is disadvantageous in that a large amount of energy is necessary for forming a single-tone image, and accordingly the manufacturing cost is relatively high.

SUMMARY OF THE INVENTION

Accordingly, an object of this invention is to improve the arrangement of a conventional magnetic latent image forming apparatus to thereby eliminate the above-described difficulty characteristic of conventional apparatus. More specifically, it is an object of this invention to provide a magnetic latent image forming apparatus which is simple in construction and which can form single-tone images or half-tone images with a small quantity of energy.

Briefly, the foregoing object is achieved according to this invention by an apparatus which heats the magnetic medium to temperatures lower than the Curie temperature and before the medium cools a controlled bias magnetic field is applied to the magnetic medium, to form a magnetic latent image corresponding to single-tone image data or half-tone image data.

DETAILED DESCRIPTION OF THE PREFERRED EMBODIMENTS

One example of a magnetic latent image forming apparatus according to this invention will now be described with reference to the accompanying drawing, first with reference to FIG. 1 which shows an example of the magnetic latent image forming apparatus of the invention.

Figure 1:
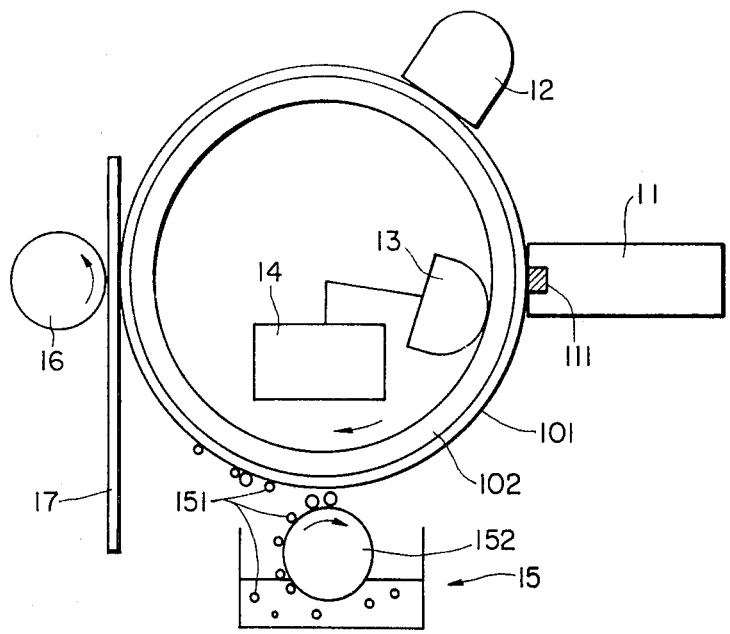
FIG. 1 is an explanatory diagram showing the arrangement of one example of a magnetic latent image forming apparatus according to this invention.

In FIG. 1, reference numeral 101 designates a magnetic medium; 102, a support (in the form of a drum, in this example); 11, a thermal head; 111, a heat generating element; 12, an initial magnetizing unit; 13, a bias magnetic field source; 14, a control circuit for the source 13; 15, a developer; 151, magnetic toner particles; 152, a toner sticking roll for causing the toner particles to stick onto a magnetized portion of the magnetic medium 101; 16, a transfer roll; and 17, a recording sheet.

Figure 2:
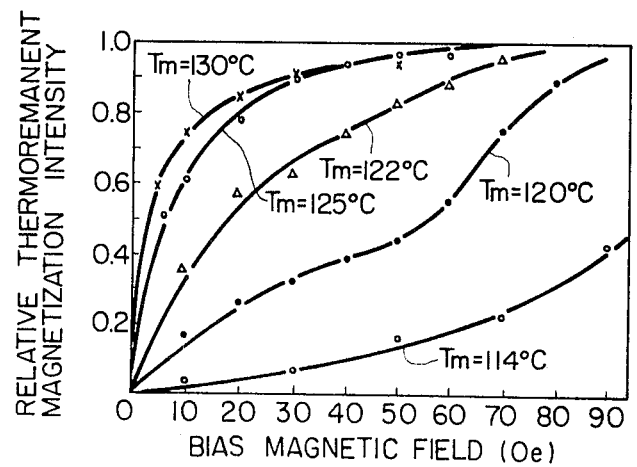
FIG. 2 is a graphical representation indicating the relationships between heating temperature, bias magnetic field and magnetization intensity.

FIG. 2 is a graphical representation indicating magnetization intensities with temperatures at which the magnetic medium 101 is heated by the heating element 111 of the thermal head 11, under the condition that the bias magnetic field is maintained constant. As is apparent from FIG. 2, with a bias magnetic field maintained constant, the intensity of magnetization can be varied with heating temperature.

The magnetic latent image forming apparatus thus arranged operates to record an image as follows:

The magnetic medium 101 is formed by coating a magnetic material (such as $CrO_2$ having a Curie temperature of 130° C.) on the support 102. The magnetic medium 101 is unidirectionally saturated, or demagnetized, by the initial magnetizing unit 12. It should be noted that the invention is applicable to both single-tone image forming processes wherein the magnetic medium 101 is initiallly unidirectionally saturated, and single-tone image forming processes wherein the magnetic medium is initially demagnetized.

In the case where the magnetic medium 101 is unidirectionally saturated by the initial magnetizing unit 12, a single-tone image is formed as follows: Energy is applied to the heat generating element 111 of the thermal head 11 according to the image data, to heat the magnetic medium 101 confronting the heating element 111, to thereby change the intensity of magnetization. By heating selected portions of the magnetic medium 101 to temperature lower than the Curie temperature, these portions of the magnetic medium are selectively demagnetized according to the image data since no bias magnetic field is yet being applied.

Although it has conventionally been considered necessary to heat the medium to a temperature in excess of its Curie temperature for demagnetization to occur, the present inventors have discovered that demagnetization can be achieved at temperatures somewhat below the Curie temperature, with the exact temperature required differing from material to material. The exact temperature required will be below but in the vicinity of the Curie temperature, and can be determined on an empirical basis. Thus, one novel aspect of the present invention resides in that it is unnecessary to heat the medium all the way to or in excess of the Curie temperature. For example with a magnetic medium of $CrO_2$ having a Curie temperature of 130° C., it may be sufficient to heat the medium to only approximately 110° C. for the present invention to be effective. This reduction in heating temperature of over 15 percent will represent a considerable energy savings and result in a wider usefulness of the invention.

Before the magnetic medium 101 has cooled, a magnetic field varying in magnitude e.g., sinusoidally in the direction of movement of the magnetic medium, but always in a direction opposite to the initial magnetization if any, is applied to the magnetic medium 101 by the bias magnetic field source (such as an electromagnet) 13 under the control of the control circuit 14. As a result, a wavy magnetization intensity is given to the portions of the magnetic medium 101 which have been heated by the heat generating element 111 of the thermal head 11.

Next, the magnetic toner particles 151 in the developer 15 are applied to the magnetic medium 101 by the toner sticking roll 152, as a result of which the magnetic toner particles 151 adhere to the portion of the magnetic medium 101 which has been magnetized by the bias magnetic field source 13. However, the initially provided saturated magnetization remains on the portion of the magnetic medium which has not been heated by the heat generating element 111 of the thermal head 11. Due to the polarization of the saturated portions, no magnetic toner particles adhere to the saturated portions, which thus appear blank. In this fashion, an image is formed on the magnetic medium with the magnetic toner particles.

The image thus formed is subsequently transferred onto the recording sheet 17, as a result of which a single-tone image is recorded.

In the case where the magnetic medium 101 is demagnetized by the initial magnetizing unit 12, a single-tone image is formed as follows: Similarly as in the above-described case, energy is applied to the heat generating element 111 of the thermal head 11 according to the image data, to locally heat the magnetic medium 101 which moves while in contact with the heat generating element 111. Before the magnetic medium 101 has cooled, a wavy magnetic field bias is applied to the magnetic medium 101 by the bias magnetic field source 13, as a result of which magnetization which varies in the direction of drum travel is given to the portions of the magnetic medium 101 which have been heated by the heat generating element 111 of the thermal head 11. However, the portions of the magnetic medium 101 which have not been heated are not magnetized by the bias magnetic field source 13 since, as shown in FIG. 2, the magnetization intensity in these portions will be minimal.

Accordingly, in the subsequent step the magnetic toner particles 151 in the developer 15 are caused to adhere only to the portions of the magnetic medium which have been magnetized by the bias magnetic field source 13, to thereby form a latent image.

The latent image is subsequently transferred onto the recording sheet by the transfer roll 16, whereby a single-tone image is recorded.

While the invention has been described above with reference to the case where the bias magnetic field varies sinusoidally, it will be understood that the invention is not limited thereto or thereby. That is, it is obvious that the bias magnetic field may vary in some other fashion such as a square wave or a triangular wave, or it may even be a constant value.

As is apparent from FIG. 2, half-tone images can also be recorded by varying the heating temperature of the heat generating element 111 of the thermal head 11 with the bias magnetic field maintained unchanged.

A method of forming a half-tone image with the magnetic medium 101 unidirectionally saturated, and a method of forming a half-tone image with the magnetic medium 101 demagnetized, will now be described.

First, the method of forming a half-tone image with the magnetic medium 101 unidirectionally saturated by the initial magnetizing unit 12 will be described. After initial magnetization, energy is applied to the heat generating element 111 of the thermal head 11 according to the image data, to heat the magnetic medium 101 which moves while in contact with the heat generating element, to thereby vary the intensity of magnetization. In other words, with temperatures no higher than the Curie temperature, the intensity of magnetization of the recording medium 10 is varied in accordance with the image data.

Thereafter, before the heated portion of the magnetic medium is cooled down, a stationary bias magnetic field is applied to the magnetic medium 101 by the bias magnetic field source (such as a permanent magnet) 13. Since a stationary bias magnetic field is employed, as is apparent from FIG. 2, the portion which has been heated to a high temperature is strongly magnetized, while the portion which has been heated to a low temperature is weakly magnetized.

The variations of magnetization intensity occur only in the portions of the magnetic medium which correspond to the dots bearing the image data, since these are the only portions which have been heated. Since the magnetic toner particles are attracted by magnetic poles, the amount of toner particles adhering to the magnetic medium varies with the variations in magnetization intensity, which results in density modulation. Thus, a half-tone image is formed with the magnetic toner particles.

In the case where the magnetic medium 101 is demagnetized by the initial magnetizing unit 12, a half-tone image is formed as follows. After demagnetization, energy is applied to the heat generating element 111 of the thermal head 11 according to the image data, to locally heat the magnetic medium 101 which moves while in contact with the heat generating element. In other words, with temperatures lower than the Curie temperature, the magnetic medium 101 is heated to various levels corresponding to the image data.

Similarly as in the above-described method, before the heated portion of the magnetic medium 101 is cooled down, a stationary bias magnetic field is applied to the magnetic medium 101 by the bias magnetic field source (such as a permanent magnet) 13. As a result, the portion which has been heated to a high temperature is strongly magnetized while the portion which has been heated to a low temperature is weakly magnetized, as is apparent from FIG. 2.

The variations of magnetization intensity occur only in the portions of the magnetic medium which correspond to the dots bearing the image data. Since the magnetic toner particles are attracted by magnetic poles, the amount of toner particles adhering to the magnetic medium varies with the variations in magnetization intensity, which results in density modulation. Thus, a half-tone image is formed with the magnetic toner particles thus attracted.

In the above-described half-tone methods, the bias magnetic field is preferably a constant value; however, it is obvious that the bias magnetic field may vary sinusoidally or in some other manner.

The invention has been described with respect to the case where the magnetic medium is heated by the heat generating element of the thermal head; however, the magnetic medium may be heated by alternative methods such as a laser beam. In this case, a laser beam outputted by a laser oscillator is applied through a modulator and a scanning mirror to the $CrO_2$ layer of the magnetic recording medium to heat the latter, and an image signal is applied to the modulator. A mode-locked YAG laser having at least an energy density of 0.1 $J/cm^2$ per pulse can be used. However, a $CO_2$ laser, an Ar laser or a high power He-Ne laser may also be employed.

As is apparent from the above description, in this invention, after the magnetic medium has been heated but before it is cooled down, the bias magnetic field of either a constant value or a variable value such as a sinusoidal varying wave is applied to the magnetic medium by the bias magnetic field source. The invention is advantageous in that the apparatus is simple in construction, and single-tone images or half-tone images can be formed by using a small quantity of energy.

The invention is further advantageous in that half-tone images can be recorded, resulting in high quality recorded image, corresponding to the dot portions bearing the image data. Further, the heating temperature may be lower than the Curie temperature, which results in an increase of the range of application of the apparatus of this invention.

What is claimed is:

1. A copying machine comprising:
   a rotatable drum-shaped support;
   a $CrO_2$ magnetic medium disposed on an outer surface of said support;
   an initial magnetization unit extending parallel to an axis of rotation of said support, said initial magnetization unit applying a magnetic field to said magnetic medium to uniformly magnetize said magnetic medium in a predetermined direction;
   a laser-type thermal recording head said recording head being disposed adjacent said initial magnetization unit on a side thereof in a direction of rotation of said support, said recording head heating portions of said magnetic medium to a temperature of approximately 110° C. in response to control signals applied thereto to magnetize said magnetic medium in a pattern representing an image to be copied;
   a bias magnetic field source extending parallel to said axis of rotation of said support and being disposed on an inner surface of said support, said bias magnetic field source being disposed adjacent said recording head in said direction of rotation of said support, said bias magnetic field source applying a varying magnetic field to said magnetic medium in a direction opposite said predetermined direction;
   a developer section comprising a supply of magnetic toner particles and a rotating toner roll for supplying toner particles from said supply to said magnetic medium at a position following said bias magnetic field source in said direction of rotation of said support; and
   means for transferring magnetic toner particles adhering to said magnetic medium to a recording sheet.

2. The copier of claim 1, wherein said initial magnetization unit magnetizes said magnetic medium to saturation.

* * * * *